(12) United States Patent
Fasen et al.

(10) Patent No.: US 8,896,958 B2
(45) Date of Patent: Nov. 25, 2014

(54) TAPE WIDTH MEASUREMENTS

(75) Inventors: Donald J Fasen, Boise, ID (US); Jeffrey S McAllister, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 63 days.

(21) Appl. No.: 13/353,442

(22) Filed: Jan. 19, 2012

(65) Prior Publication Data
US 2013/0188271 A1 Jul. 25, 2013

(51) Int. Cl.
G11B 15/18 (2006.01)
B65H 59/38 (2006.01)
G11B 15/46 (2006.01)
G11B 23/42 (2006.01)

(52) U.S. Cl.
USPC .......................... 360/72.1; 360/71; 242/334.6

(58) Field of Classification Search
None
See application file for complete search history.

(56) References Cited

U.S. PATENT DOCUMENTS

| | | | |
|---|---|---|---|
| 6,563,659 B1 * | 5/2003 | Fasen | 360/71 |
| 2006/0072235 A1 * | 4/2006 | Kuse et al. | 360/71 |
| 2006/0092547 A1 * | 5/2006 | Kawakami et al. | 360/71 |
| 2007/0076316 A1 * | 4/2007 | Kuse et al. | 360/69 |
| 2008/0191081 A1 * | 8/2008 | Ishikawa et al. | 242/348 |
| 2011/0170214 A1 * | 7/2011 | Bui et al. | 360/71 |

* cited by examiner

Primary Examiner — Daniell L Negron
(74) Attorney, Agent, or Firm — Steven L. Webb

(57) ABSTRACT

A tape drive is disclosed. The tape drive determines a current tape width and writes data to the tape as well as the current tape width. The tape width written to the tape is associated with the data. When reading data from a tape the tape drive reads the stored tape width and adjusts the current tape width to match the stored tape width before reading the data associated with the stored tape width.

19 Claims, 7 Drawing Sheets

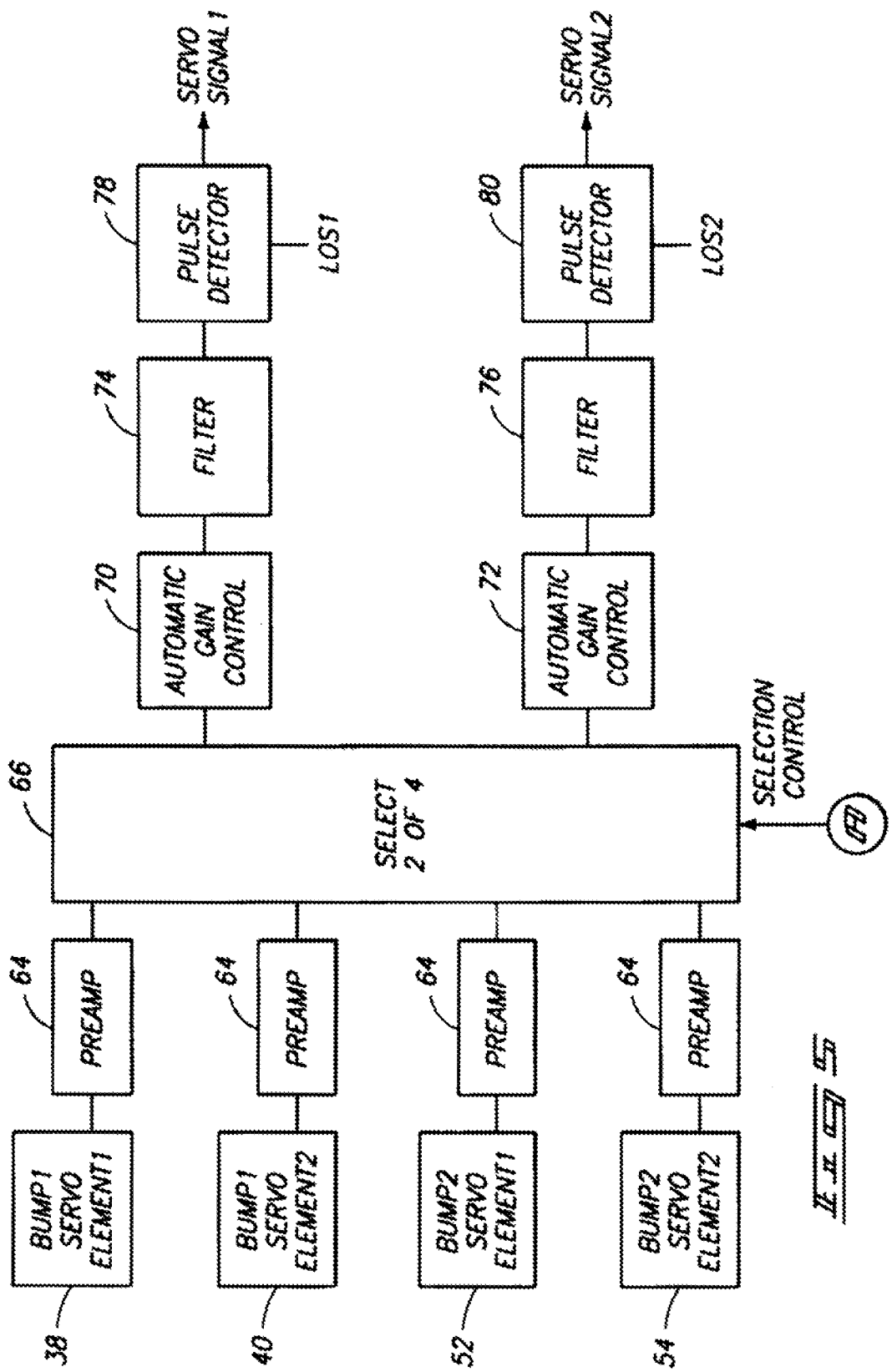

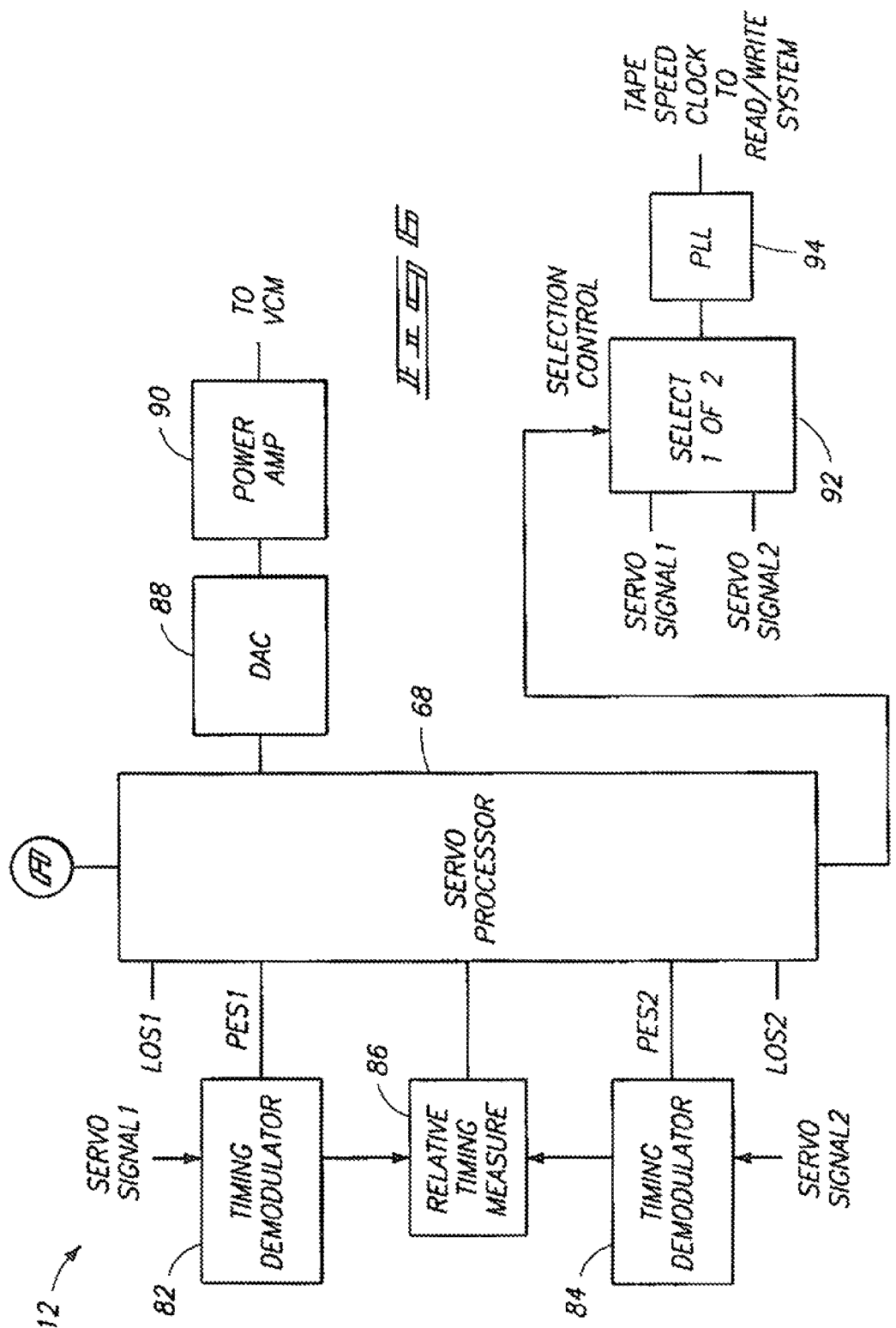

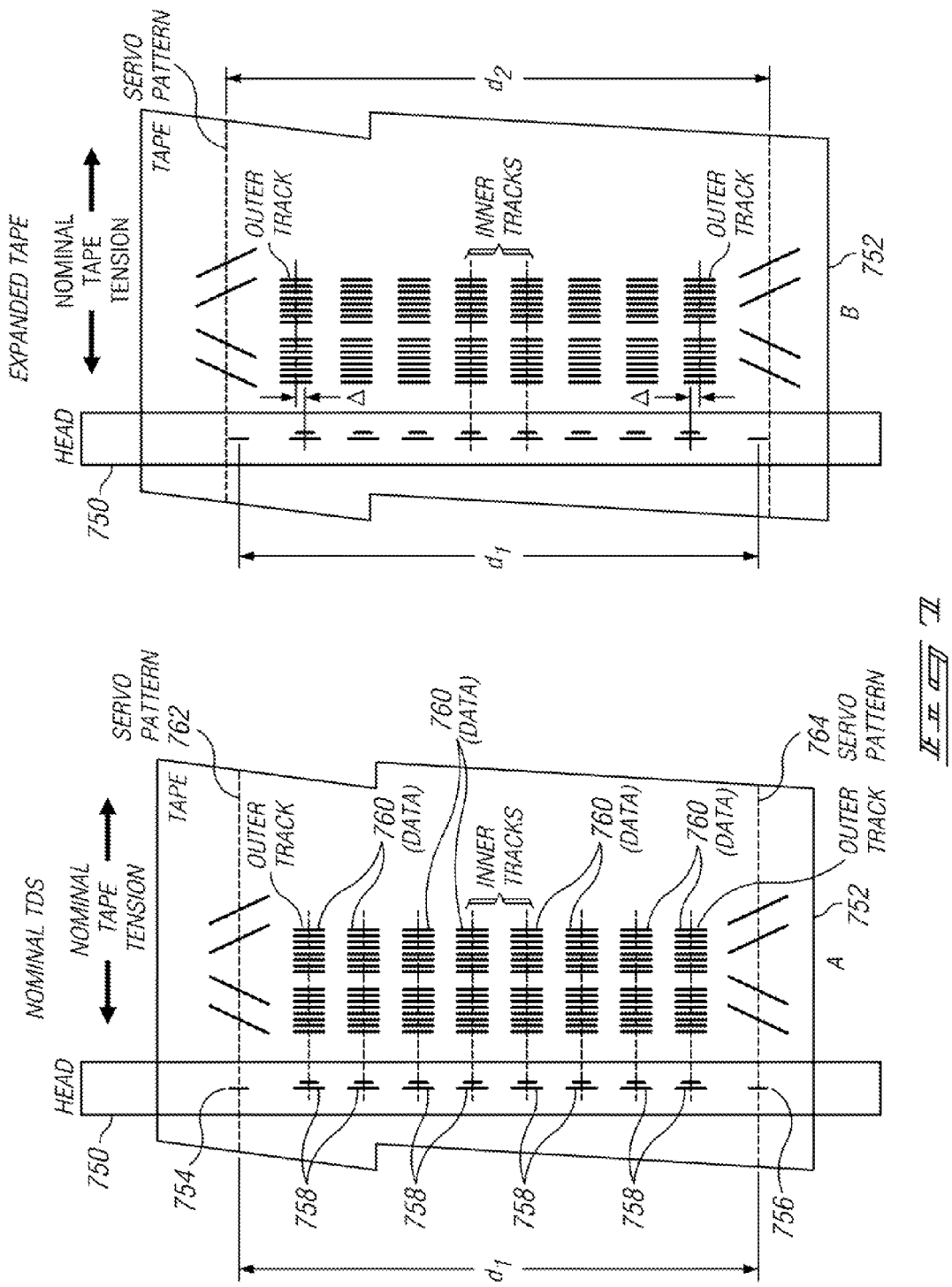

TAPE WIDTH MEASUREMENTS

BACKGROUND

Tape drives store date onto tapes. Typically tape drives store multiple tracks of data across the width of the tape simultaneously with multiple read/write elements on the head. The spacing between the read/write elements on the tape heads is closely controlled. When the width of the tape changes, the spacing of the data tracks across the width of the tape also change. When the spacing between data tracks change, the data tracks on the tape may no longer be aligned to the read/write elements on the tape head. If the position of the tape head is adjusted to align to one track of data on the tape, other tracks may no longer be aligned and may not be able to be read simultaneously.

The width of the tape may change due to a number of different factors. Changes in temperature cause changes in the width and in the length of the tape. Increases in temperature cause increases in both the width and length of the tape. Changes in humidity also cause changes in the length and width of the tape, with an increase in humidity acting to increase both the width and length of the tape. Changes in tension also affect the width and length of the tape. Increases in tension cause the tape to lengthen, but cause the width to decrease.

Tape drives are typically used in controlled environments (i.e. temperature and humidity control). Tapes are generally removable from the tape drive and therefore may be stored outside of a controlled environment or transported outside of a controlled environment. For example, a tape may be shipped to a data center and put into the tape drive as soon as the tape arrives. If the data center is located in a northern area during the winter, the tape may be cold and dry when it is inserted into the tape drive. If the data center is located in a southern area during the summer, the tape may be hot and wet when it is inserted into the tape drive. The difference between a cold tape and a hot tape may be 100 degrees F. or more. The difference between a dry tape and a wet tape may be as much as 80% relative humidity.

BRIEF DESCRIPTION OF THE DRAWINGS

FIGS. 5-6 provide a block diagram illustrating a servo system including the servo elements of FIG. 2, for maintaining the position of the head relative to desired tracks and bands of the magnetic recording medium, and for maintaining the speed of travel of the magnetic recording medium relative to the head.

FIG. 7A shows a simplified layout of a tape head for reading and writing data to a tape in an example embodiment of the invention.

FIG. 7B is the same tape system as shown in FIG. 7A except that tape 752 is shown as expanded.

DETAILED DESCRIPTION

FIG. 1-8, and the following description depict specific examples of the invention. For the purpose of teaching inventive principles, some conventional aspects have been simplified or omitted. Those skilled in the art will appreciate variations from these examples that fall within the scope of the invention. The features described below can be combined in various ways to form multiple variations of the invention. As a result, the invention is not limited to the specific examples described below, but only by the claims and their equivalents.

In one example embodiment of the invention, a tape drive will determine the width of a tape when data was written onto the tape. The tape drive will adjust the current tape width to match the old tape width before reading data from the tape. The tape drive will adjust the tape width by changing the tension on the tape. In another embodiment, the tape drive will determine the current width of the tape using a nominal tension. The tape drive will write the data along with the current tape width onto the tape. The current tape width will be associated with the data.

Figure 1:
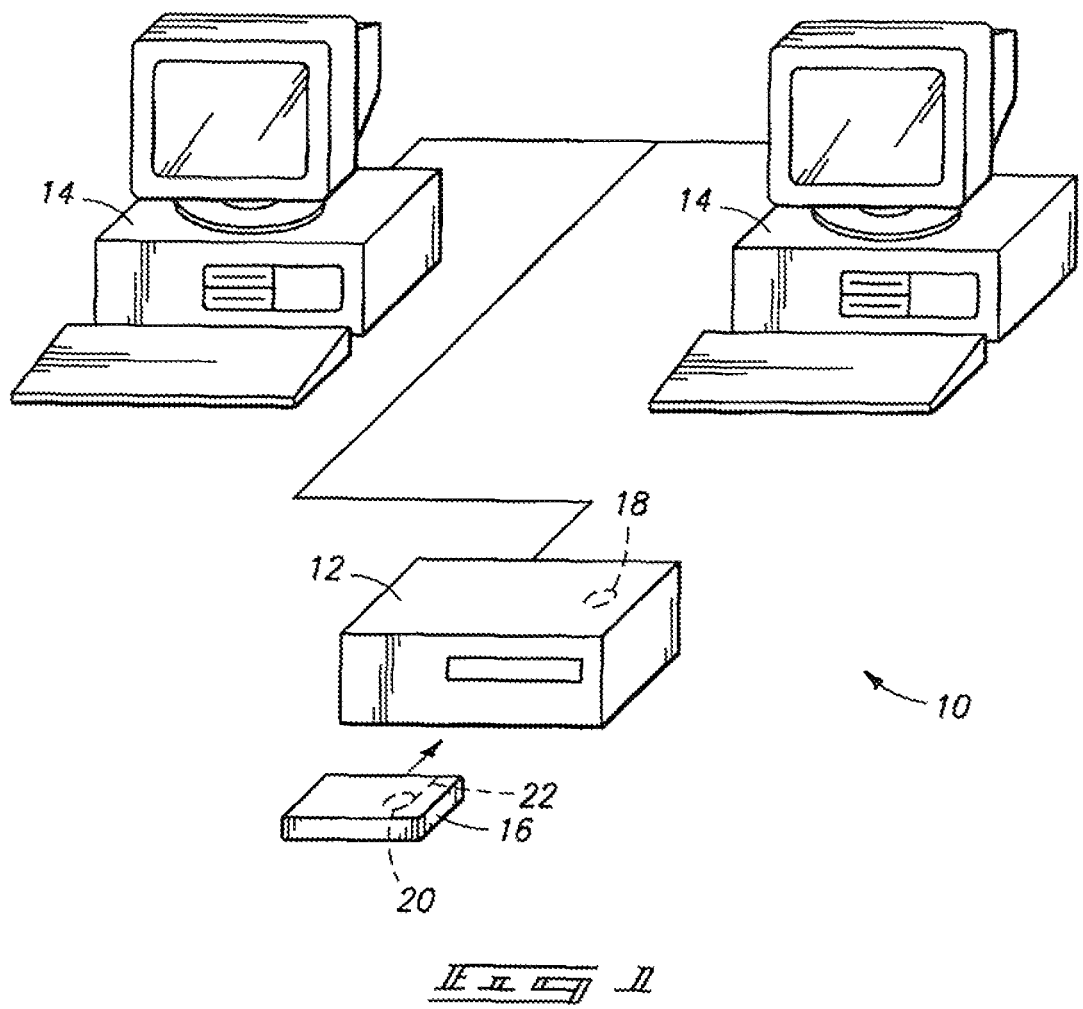
FIG. 1 is a perspective view of a computer network embodying the invention and including a magnetic recording tape drive.

FIG. 1 shows a computer network 10 including a data storage device or system 12 embodying the invention, and including one or more computers 14. The data storage device 12 reads data from and writes data to magnetic storage media. In one embodiment, the data storage device 12 is a stand alone tape drive. In another embodiment, the data storage device 12 is supported in a bay inside a housing of a computer 14 which forms a part of the network 10. In the illustrated embodiment, the data storage device 12 is a linear recording tape drive.

The tape drive 12 is used with tape cartridges 16, in one embodiment of the invention. In an alternative embodiment of the invention, the tape drive 12 is a reel to reel tape drive of the type that supports open reels. In the illustrated embodiment, the tape cartridge 16 is a single reel type tape cartridge, and includes a reel 20, and tape 22 wound on the reel 20. A second reel 18 is included in the tape drive 12 and engages the tape 22. In an alternative embodiment, the tape cartridge 16 includes two reels. While other widths can be employed, in the illustrated embodiment, the tape 22 has a width W of one half inch. The tape 22 also has a length in a direction perpendicular to the width W of the tape. A plurality of parallel tracks 24A, 24B, 24C, 24D, 24E, 24F, 24G, 24H, 24I, 24J, 24K, 24L, 24M, 24N, 24O, and 24P (24A-P) are defined across the width of the tape 22. The tracks 24A-P extend in the direction of the length of the tape 22.

The tape drive 12 includes a tape head 26 having a first bump 28 including a plurality of read/write elements 30, 32, 34, and 36 for reading data from or writing data to the tape in the parallel tracks 24, and a plurality of servo elements 38, and 40 for reading servo code from the tape in parallel bands 41A, 41B, 41C, 41D, and 41E different from the data tracks 24. In the illustrated embodiment, the servo code is pre-written to the parallel bands 41A, 41B, 41C, 41D, and 41E by another servo writer that may or may not be included in the tape drive 12. In another embodiment, the servo elements 38 and 40 are used for writing servo code to the parallel bands.

Figure 2:
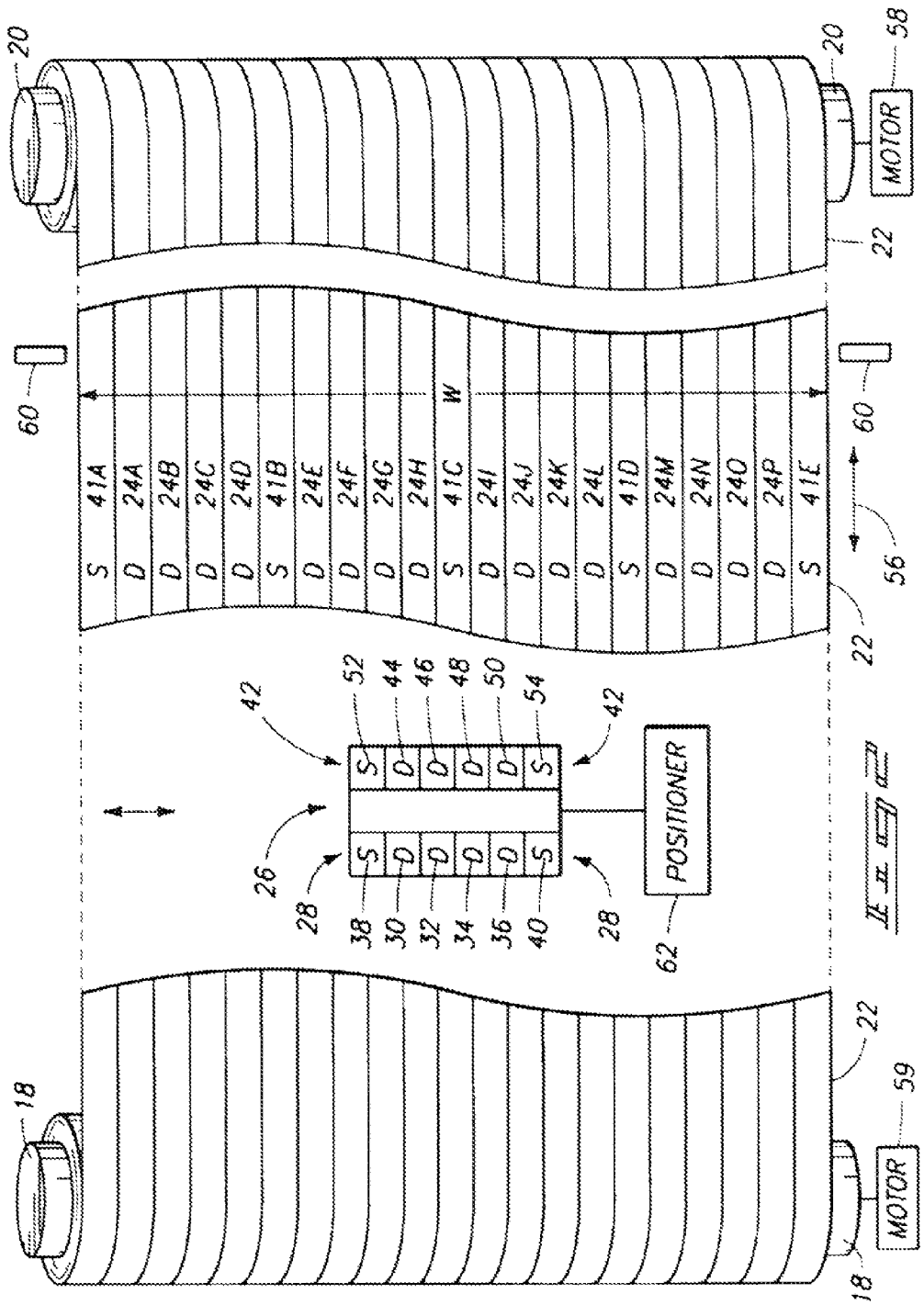
FIG. 2 is a diagrammatical perspective view illustrating an arrangement of servo elements and read/write elements on a head in the tape drive, and illustrating an arrangement of data tracks and servo bands on a tape on which the head operates.

In FIG. 2, four sets of parallel data tracks are shown. However, various numbers of sets of data tracks can be employed. For example, in one embodiment, there are thirteen sets of data tracks, and an appropriate number of servo bands (e.g., with each of the thirteen sets of data tracks being located between two servo bands). Other numbers of sets can also be employed, for example 8 or 16 data tracks.

In the illustrated embodiment, the first bump 28 has four read/write elements, and two servo elements; however, in alternative embodiments, different numbers of read/write elements, or additional servo elements can be employed. In the illustrated embodiment, a "bump" is an area on the head having a column of (read/write and/or servo) elements. It is called a "bump" because it typically protrudes relative to the rest of the head. However, in the following disclosure and claims, the term "bump" is not to be construed so as to necessarily require protrusion relative to the rest of the head.

In FIG. 2, the read/write elements and servo elements are arranged with the four read/write elements 30, 32, 34, and 36, between the two servo elements 38 and 40. In the illustrated embodiment, the servo elements 38 and 40 are respectively of a physical construction identical to the physical construction of the read/write elements 30, 32, 34, and 36.

The tape head further has a second bump 42 including a plurality read/write elements 44, 46, 48, and 50 for reading data from or writing data to the tape in the parallel tracks 24, and two servo elements 52 and 54 for reading servo code from the tape in parallel bands. In the illustrated embodiment, the servo code is pre-written to the parallel bands 41A, 41B, 41C, 41D, and 41E by another servo writer that may or may not be included in the tape drive 12. In another embodiment, the servo elements 52 and 54 are used for writing servo code to the parallel bands.

In the illustrated embodiment, the second bump 42 has four read/write elements, and two servo elements; however, in alternative embodiments, different numbers of read/write elements, or additional servo elements can be employed.

The read/write elements 44, 46, 48, and 50, and servo elements 52 and 54 of the second bump 42 are arranged with the four read/write elements 44, 46, 48, and 50 of the second bump 42 between the two servo elements 52 and 54 of the second bump 42. The servo elements 52 and 54 of the second bump are respectively of a physical construction identical to the physical construction of one of the read/write elements 44, 46, 48, and 50.

The tape drive 12 is configured to drive the length of the tape 22 in either of a first and second direction relative to the head 26, as indicated by arrow 56. More particularly, the tape drive 12 includes at least one motor 58 which moves the tape 22 relative to the head 26. For example, in the illustrated embodiment, one motor 58 drives one of the reels 18 or 20, and another motor 59 drives the other of the reels 18 or 20. In an alternative embodiment, a capstan is used to drive the tape. The tape drive 12 may include conventional components such as tapes guides 60.

The servo and read/write elements of the second bump 42 are respectively parallel to the servo and read/write elements of the first bump 28, as shown in FIG. 2. In one embodiment, when the tape is traveling in the first direction (e.g., to the right in FIG. 2) and it is desired to write to the tape, the servo element 52 of the second bump 42 reads servo code from the servo band 41B on the tape to produce a servo signal, the read/write element 30 of the first bump 28 writes data to the track 24E, the read/write element 44 of the second bump 42 reads data from the track 24E, the read/write element 32 of the first bump 28 writes data to the track 24F, the read/write element 46 of the second bump 42 reads data from the track 24F, the read/write element 34 of the first bump 28 writes data to the track 24G, the read/write element 48 of the second bump 42 reads data from the track 24G, the read/write element 36 of the first bump 28 writes data to the track 24H, the read/write element 50 of the second bump 42 reads data from the track 24H, and the servo element 54 of the second bump 42 reads servo code from the servo band 41C to produce a servo signal.

When the tape is traveling in the second direction (e.g., to the left in FIG. 2) and it is desired to write to the tape, the servo element 38 of the first bump 28 reads servo code from the servo band 41B on the tape to produce a servo signal, the read/write element 30 of the first bump 28 reads data from the track 24E, the read/write element 44 of the second bump 42 writes data to the track 24E, the read/write element 32 of the first bump 28 reads data from the track 24F, the read/write element 46 of the second bump 42 writes data to the track 24F, the read/write element 34 of the first bump 28 reads data from the track 24G, the read/write element 48 of the second bump 42 writes data to the track 24G, the read/write element 36 of the first bump 28 reads data from the track 24H, the read/write element 50 of the second bump 42 writes data to the track 24H, and the servo element 40 of the first bump 28 reads servo code from the servo band 41C to produce a servo signal.

Figure 3:
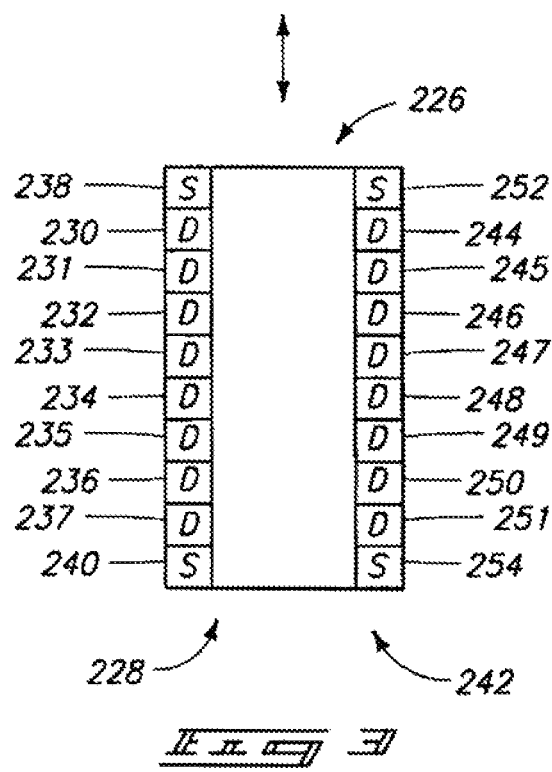
FIG. 3 is a diagrammatical perspective view illustrating an arrangement of servo elements and read/write elements on a head in accordance with an alternative embodiment of the invention.

FIG. 3 shows a head 226 in accordance with an alternative embodiment of the invention, wherein each of two bumps 228 and 242 includes eight read/write elements and two servo elements. More particularly, the first bump 228 of the head 226 includes servo elements 238 and 240, and read/write elements 230, 231, 232, 233, 234, 235, 236, and 237 between the servo elements 238 and 240, and the second bump 242 of the head 226 includes servo elements 252 and 254, and read/write elements 244, 245, 246, 247, 248, 249, 250 and 251 between the servo elements 252 and 254. The head 226 operates on a tape having, of course, eight data tracks between each pair of servo bands.

By employing two servo elements for reading from two servo bands, defects in the tape can be tolerated. Because the servo elements bracket the read/write elements, tape defects of maximum widths can be tolerated. If one servo band on the tape is corrupted, the other servo band is used.

Figure 4:
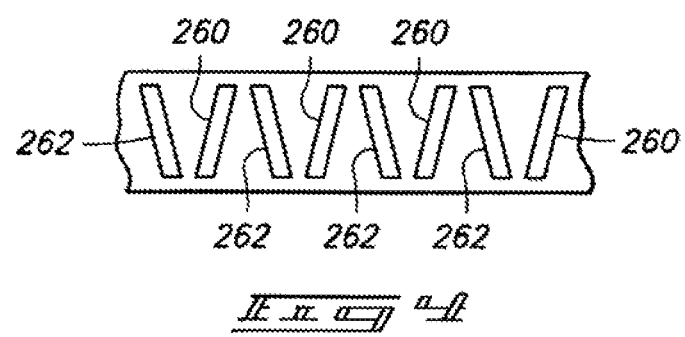
FIG. 4 is a diagrammatical plan view illustrating one possible servo band configuration that could be included in the magnetic recording medium shown in FIG. 2.

FIG. 4 illustrates a servo band configuration that could be employed in one embodiment of the invention for a servo band 41A, 41B, 41C, or 41D. This servo band configuration is a servo band configuration which provides both an indication of position (and speed) in the direction of travel of the tape, and an indication of lateral position of the tape relative to the servo element reading the servo band. The tape drive 12 includes a timing based demodulation scheme for sensing the servo information on the tape. The position of the head 26 relative to the tape width is derived from the relative timing of azimuthally sloped transitions 260 and 262. The servo code thus includes two elements: 260, which are written with a forward slope or positive azimuth angle, and transitions 262, which are written at a backward slope or negative azimuth angle and may or may not be symmetrical with respect to the transition 260. The time difference between read back pulses generated using a servo element is used to indicate the servo element's position in a servo band. By using a high resolution timing measurement, a high resolution position measurement is achieved. See European Patent Application EP 0690442 A2 for detailed information regarding servo systems that could be employed in the tape drive 12. Thus, the pattern is written with one frequency on one side of the band, and another frequency on the other side of the band.

The tape drive 12 further includes a positioner 62 which is mechanically coupled to the head and positions or moves the head in the direction of the width of the head to move the head between various positions for reading or writing to different tracks. For example, in a first position, the servo element 38 is positioned to operate on the servo band 41A and the servo element 40 is positioned to operate on the servo band 41B; in a second position, the servo element 38 is positioned to operate on the servo band 41B and the servo element 40 is positioned to operate on the servo band 41C; and in a third position, the servo element 38 is positioned to operate on the servo band 41C and the servo element 40 is positioned to operate on the servo band 41D. This leads into a discussion of but one advantage of the invention. The illustrated arrangement of servo elements and data elements on the head makes for efficient use of available space on the tape for servo bands. Servo bands are spaced on the tape to match the distance between the servo elements on the head. It is thus possible to share bands between one data track set and the adjacent data track set. This tape configuration has no more servo overhead than would a system that used only a single servo element per bump, except for one extra servo band at one of the edges of the tape.

The positioner 62 also moves the head in the direction of the width of the tape to make minute corrections to ensure that the read/write elements are accurately positioned over desired tracks during reading or writing operations. In the illustrated embodiment, the positioner 62 comprises a voice coil motor; however, any other head positioner known in the art can be employed.

As shown in FIGS. 5-6, the tape drive 12 includes preamps 64 respectively coupled to the servo elements 38, 40, 52, and 54, and amplifying servo signals read by the servo elements which are reading servo code. This will be either the elements 38 and 40, or the elements 52 and 54, depending on the direction of tape travel, as described above. More particularly, the tape drive 12 includes a selection or switching circuit 66, coupled to the preamps 64, and enabling or using the preamps associated with the servo elements which are reading the servo code.

The tape drive 12 further includes a servo processor 68 which sends a selection control signal to the circuit 66 to select the appropriate pair of preamps depending on the direction of tape travel.

The tape drive 12 further includes automatic gain control circuits 70 and 72 respectively coupled to the preamps associated with the servo elements which are reading the servo code. The tape drive 12 also includes filters 74 and 76 respectively coupled to the automatic gain control circuits 70 and 72 to filter the signals produced by the automatic gain control circuits. In the illustrated embodiment, the filters 74 and 76 are band pass filters, and are used to remove noise. The tape drive 12 further includes first and second pulse detectors 78 and 80 respectively coupled to the filters 74 and 76. The pulse detectors produce servo signals, "SERVO SIGNAL1" and "SERVO SIGNAL2" The pulse detectors also determine if either of the servo bands is corrupted. If so, the pulse detector associated with the servo element reading the corrupted servo band produces a signal LOS1 or LOS2 signifying there is a loss of signal. This loss of signal information is passed to the servo processor so it can determine whether to use the signal produced by one servo element or another. In one embodiment, if neither servo band is corrupted, servo information from both of the servo elements that are reading servo code is used, and is combined mathematically (e.g., averaged in one embodiment).

The tape drive 12 further includes timing demodulators 82 and 84 which receive timing signals "SERVO SIGNAL1" and "SERVO SIGNAL2" produced by the pulse detectors. The timing demodulators 82 and 84 produce respective position error signals PES1 and PES2 which are passed to the servo processor 68. The tape drive 12 further includes a relative timing measure circuit 86 coupled to the timing demodulators 82 and 84, and which determines the difference in timing error signals produced by the timing demodulators 82 and 84. This Delta Time signal is also passed to the servo processor 68. The servo processor 68 uses the signals from the timing demodulator 82, the timing demodulator 84, and the relative time measure circuit 86 to accurately position the head 26 over the tracks from which the read/write elements are reading or to which the react/write elements are writing. More particularly, the tape drive 12 includes a digital to analog converter 88 coupled to the servo processor and providing an analog signal. The tape drive 12 further includes a power amplifier 90 coupled to the digital to analog converter 88 and amplifying the analog output of the digital to analog converter to a value sufficient to drive the positioner 62. More particularly, in the illustrated embodiment, the power amplifier 90 is coupled to the voice coil motor. In one embodiment, the tape drive adjusts the position of the head based on the average of PES1 and PES2.

The tape drive 12 further includes a selection circuit or switching circuit 92 controlled by the servo processor 68. The circuit 92 is coupled to the pulse detectors 78 and 80, and the servo processor selects the appropriate pulse detector output by monitoring the LOS1 and LOS2 signals and determining whether and which servo signal has been lost. The tape drive 12 further includes a phase locked loop 94 coupled to the circuit 92. The phase locked loop provides a tape speed clock which is used as a clock to write data to the tape. The tape speed clock can also be used in maintaining the speed of tape travel or can be used as a read reference clock.

Tape drive 12 may also include a controller for reading and writing data to the tape. Controller may comprise a processor, an application specific integrated circuit (ASIC), memory, and the like. Controller may also control the tension in the tape. In other embodiments a separate tape tensioning system, independent from the controller, may be included inside tape drive 12. In one embodiment, tension is the tape is controlled by a differential torque between the motor 58 coupled to one reel and the motor 59 coupled to the other reel.

The tape tension is controlled by accurately controlling the torque in each motor (58 and 59) and adjusting for the amount of tape on each reel, the drag across the tape head, the thickness of the tape and the like. In other embodiments the tension in the tape may be controlled using a spring loaded or a servo driven capstan. Both types of tape tensioning systems may be used with or without a tension sensor.

FIG. 7A shows a simplified layout of a tape head for reading and writing data to a tape in an example embodiment of the invention. FIG. 7 comprises head 750 and tape 752. Head 750 has an upper servo element 754 and a lower servo element 756 to read upper and lower servo patterns (762 and 764), respectively, from tape 752. Head has eight data elements for reading and writing data onto tape 752 spaced between the upper and lower servo elements (754 and 756). The two data tracks adjacent to the servo patterns are outer data tracks and the data tracks in the middle of the two servo patterns are the inner data tracks. The servo system of the tape drive keeps the head centered between the two servo patterns.

Tape 752 is shown at a nominal size under nominal tension in FIG. 7A. Therefore the servo elements on head 750 are centered in the upper and lower servo bands, respectively. The distance D1 between the center of the upper servo band and the center of the lower servo band equals the distance D1 between the two servo elements (754 and 756) on head 750. Tape has a plurality of data tracks 760 written onto tape 752. The data tracks were written to the tape when the tape was a nominal size with a nominal tension in the tape. Therefore the centers of all the data tracks 760 line up with the centers of the data elements 758 on head 750.

FIG. 7B is the same tape system as shown in FIG. 7A except that tape 752 is shown as expanded. Tape 752 in FIG. 7B is under the same nominal tension as in FIG. 7A, however the tape 752 is wider (and longer). The increase in tape width may be due to an increase in tape temperature, an increase in tape humidity, or both. In some example embodiments, the tape may have a thermal coefficient of expansion between 5 and 15 parts-per-million (PPM) change in length per degrees C. The tape may have a hygroscopic coefficient of expansion of between 3 to 12 ppm/% of relative humidity (RH). The change in size of the tape can be calculated for a given change in temperature or humidity. For example, when the hygroscopic coefficient of expansion is 10 ppm/% RH, and the RH changes by 10%, and the tape is 12650 μm wide, the tape width would change by 10 ppm*10%*12650 μm=1.2765 μm for a 10% change in RH.

Because the tape 752 is wider and the head is the same size, the distance D2 between the center of the upper 762 and lower 764 servo bands is no longer equal to the distance D1 between the upper 754 and lower 756 servo elements. The servo bands are wide enough that the servo elements can accurately read the servo patterns and determine the center of the servo bands. Knowing the nominal size between the center of the two servo track (distance D1) and measuring the current distance between the two servo tracks (distance D2), the current tape width can be determined. In one example, the distance between the two servo bands is used as the tape width.

The data bands 760 are not as wide as the servo bands, and in some embodiments may be much narrower than the servo bands. The increase in size (width) of the tape has increased the spacing between the data tracks 760. Because the servo system keeps the head 750 centered between the two servo patterns, the misalignment between the inner data tracks and the inner data elements may be small. The misalignment between the outer data tracks and the outer data elements Δ may become large enough such that the outer data track may miss the data elements on the head. When this occurs the outer data track would not be readable. Even when the outer data tracks do not completely miss the outer data elements, the error rate reading the outer data track may increase. The misalignment of the inner data tracks to the inner data elements on the head may not be enough to increase the error rate of the inner data track.

The tape in both FIGS. 7A and 7B are under the same (nominal) tension. Increasing the tension in the tape increases the length of the tape, but decreases the width of the tape. There are inherent properties of the tape material which will determine the amount of width variation a certain tension variation will cause. The equation below relates tape properties to the width sensitivity to tension.

$$\text{WidthChange/Tension} = Mu/\text{TapeThickness}/E \text{ (um/N)}$$

where:
  Mu=Poisson's ratio=0.3 (in one embodiment)
  TapeThickness=9 μm (in one embodiment)
  E=Young's Modulus $7 \times 10^{-3}$ N/μm$^2$ (in one embodiment)
which results in a width change of 4.76 μm/N over the entire 12650 μm tape width (one half inch). These figures for Mu, tape thickness, and Young's Modulus are published figures for a tape of one material, known in the industry as PEN material, and are given by way of example only. Other figures would be applicable for different types of tape materials and may be available from the manufacturer, from publications, or may be determined by experimentation. Young's Modulus provides an indication of how much the tape will stretch per unit of force applied and varies, for example, depending on the type of material and thickness. Poisson's ratio provides an indication of how much lateral displacement occurs per unit of longitudinal displacement. For a width change of 4.76 μm/N, a tension to width relationship can be established as follows:

$$100\% * (4.76 \, \mu m/N)/(12650 \, \mu m) = 0.0376\%/N$$

With this tension to width relationship established, a method for adjusting the width of the tape can be determined. In one aspect of the invention, the tape drive 12 is designed for use with LTO format tapes. LTO or, Linear Tape-Open, is a format that defines, among other things, the number of servo bands, the spacing between the servo bands, and the servo code pattern. More information about LTO can be obtained from the assignee of the present invention or found on the Internet by searching for LTO. If the tape drive 12 is used with LTO tapes, the space between the upper and lower servo elements (e.g., 754 and 756) is 2859 μm, so a 0.1 N tension change will cause a 0.00376%=0.108 μm change in the position of the servo bands over this space. Because much of the tape wander induced position noise will be canceled by calculating the difference in of the two servo bands, the noise present in the tape width signal is much less than either of the servo signals themselves.

Because only the width of the tape is changing in response to a tension change, the response can be very rapid. A high rate of position signal information is required and available for head position control and this same rate of information is therefore also available for the tension signal. In LTO format tapes, for example, a width reading is available every 100 μm along the length of the tape.

By measuring the distance between the positions of the two servo bands, the current width of the tape can be determined. In one example, the distance between the two servo bands is used as the tape width. If the tape is wider than nominal, the tension in the tape can be increased to reduce the width of the tape. If the tape is narrower than nominal, the tension in the tape can be reduced to increase the width of the tape. By increasing or decreasing the width of the tape, the spacing between the data tracks can be adjusted such that all the data tracks will be aligned with the data elements on the head. There is a limit on the maximum and minimum tension for a tape. In some cases the tape width may have changed by a larger amount than the width of the tape can be adjusted. In these cases the tape tension can be set to its maximum or minimum value so that the tape width more closely matches the tape head length before reading the data from or writing data to the tape.

Two different methods can be used when writing data to the tape. In one embodiment, the width of the tape is adjusted to match a nominal tape width by changing the tension in the tape. Once the tape is at the nominal width the data is written onto the tape. The nominal tape width could be the same value for all tapes of the same type, or the nominal tape width could be written onto each tape. When reading the data written with this method, the width of the tape would be adjusted to the nominal tape width and then the data would be read.

In another embodiment, tension in the tape is set at a nominal value. The distance between the two servo bands is measured and the current tape width is determined. Data is written onto the tape along with the current tape width, where the current tape width is associated with the data. The current tape width can be associated with the data in a number of ways, for example writing the current tape width into the header for the data. When reading the data written with this method, the stored tape width is read from the tape. The tension in the tape is adjusted such that the current tape width matches the stored tape width. Then the data is read from the tape.

Some tapes may not have a nominal width or a current width associated with data written to the tape, for example legacy tapes. These tapes can still benefit from using this technique. In one embodiment, the data from a set of tracks is read using a nominal tension in the tape. The error rate between the inner and outer data track are compared. When the error rate of the outer data track is larger than the error rates of the inner data tracks by some threshold, it would indicate that the data was written to the tape when the tape was a different width. The width of the tape can be adjusted by changing the tension in the tape. As the width of the tape is changed, the error rates of the inner and outer tracks can be compared. When the difference between the error rates of the inner and outer tracks is minimized, the current tape width will be a match for the tape width used when the data was written to the tape.

Figure 8A:
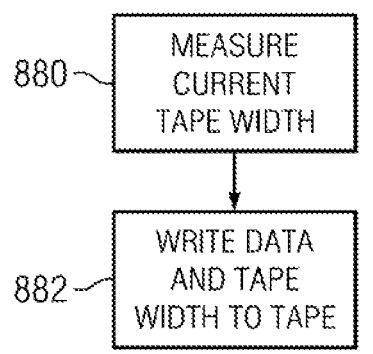
FIGS. 8A and 8B are flow charts in example embodiments of the invention.
Figure 8B:
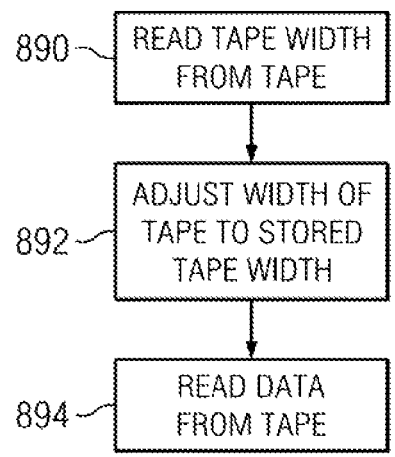

FIGS. 8A and 8B are flow charts in example embodiments of the invention. FIG. 8A is a flow chart for writing data to a tape. At step 880 the current tape width is measured. At step 882 the current tape width and the data are written onto the tape. FIG. 8B is a flow chart for reading data from a tape. At step 890 a stored tape width is read from the tape. At step 892 the width of the tape is adjusted by changing the tension in the tape. The width of the tape is changed to the stored width read from the tape. At step 894 the data is read from the tape. In some cases the tape width read from the tape may be a nominal tape width.

What is claimed is:

1. A tape drive, comprising:
 a first and a second servo element to read a number of azimuthally sloped transitions on a first and a second servo band on a tape traveling in a first direction;
 a servo processor to calculate a current tape width by determining a distance between the first and second servo bands;
 a tape tensioning system to adjust the current tape width to a predetermined tape width before writing information to the tape;
 a controller to write information to the tape;
 the controller writing data to the tape and writing the current tape width onto the tape, wherein the current tape width is associated to the data.

2. The tape drive of claim 1, wherein the tape is in the linear tape-open (LTO) format.

3. The tape drive of claim 1, wherein the current tape width is stored in a header of the data or other recoverable sections of the data.

4. The tape drive of claim 1, further comprising:
 a tape tensioning system to adjust a current tape tension to a nominal tension wherein data is written to the tape using the nominal tension.

5. The tape drive of claim 1, further comprising:
 a tape tensioning system to adjust the current tape width to a nominal tape width by change a tension in the tape before writing the data to the tape.

6. The tape drive of claim 1, further comprising a third and a fourth servo element to read the first and the second servo band on the tape travelling in a second direction.

7. The tape drive of claim 1, further comprising:
 a tape width system to adjust a current tape width to a nominal width wherein data is written to the tape using the nominal width.

8. The tape drive of claim 1, wherein the predetermined tape width is based on a maximum tape tension, a minimum tape tension, or combinations thereof.

9. The tape drive of claim 1, wherein the tape tensioning system adjusts the current tape width to a tape width determined for tapes of a same type as the tape.

10. A method of writing data to a tape, comprising:
 reading a number of azimuthally sloped transitions on a first and second servo band on a tape traveling in a first direction;
 calculating a current tape width by determining a distance between the first and second servo bands;
 adjusting the current tape width towards a predetermined tape width by changing a tension in the tape before writing the data to the tape;
 writing the data onto the tape;
 writing the measured tape width onto the tape and associating the measured tape width to the data.

11. The method of claim 10, wherein the current tape width is measured with a nominal tension in the tape.

12. A tape drive, comprising:
 a first and a second servo element to read a first and a second servo band on a tape traveling in a first direction;
 a servo processor to calculate a current tape width by determining a distance between the first and second servo band;
 a controller to read data from the tape using a nominal tape tension;
 a tape tensioning system to adjust the current tape width to a predetermined tape width before writing information to the tape;
 the controller writing data to the tape and writing the current tape width onto the tape, wherein the current tape width is associated to the data.

13. The tape drive of claim 12, wherein the tape is in the linear tape-open (LTO) format.

14. The tape drive of claim 12, wherein the current tape width is stored in a header or other recoverable sections of the data.

15. The tape drive of claim 12, further comprising a third and a fourth servo element to read the first and the second servo band on the tape travelling in a second direction.

16. The tape drive of claim 12, wherein the tape tensioning system adjusts the current tape width by changing a tension in the tape to a threshold amount.

17. The tape drive of claim 12, further comprising a corruption detector to detect if either of the first and the second servo band are corrupted.

18. A method of reading data from a tape, comprising:
 determining when there is a stored tape width associated with the data when there is a stored tape width associated with data:
   reading from the tape, a stored tape width associated with data stored onto the tape;
   adjusting the tension in the tape to change the current tape width to more closely match the stored tape width when the current tape width is a threshold amount greater than the stored tape width; and
   reading the associated data from the tape;
 when there is not a stored tape width associated with the data:
   reading data from the tape using a nominal tape tension;
   calculating an initial delta error rate between an error rate in at least one center data track and an error rate in at least one outer data track;
   when the initial delta error rate is above a threshold:

changing the width of the tape to a new tape width by adjusting the tension in the tape;

reading data from the tape using the new tape width and calculating a new delta error rate between an error rate in at least one center data track and an error rate in at least one outer data track;

optimizing the tape width by reducing the new delta error rate to a minimum;

reading the data from the tape using the optimized tape width;

when the initial delta error rate is not above a threshold:

reading the data from the tape using the nominal tape tension.

19. The method of claim 18, further comprising manipulating servo code stored on servo bands of the tape.

* * * * *

UNITED STATES PATENT AND TRADEMARK OFFICE
CERTIFICATE OF CORRECTION

PATENT NO.       : 8,896,958 B2
APPLICATION NO.  : 13/353442
DATED            : November 25, 2014
INVENTOR(S)      : Donald J. Fasen et al.

It is certified that error appears in the above-identified patent and that said Letters Patent is hereby corrected as shown below:

In the Claims

In column 10, line 52, in Claim 18, delete "data" and insert -- data; --, therefor.

Signed and Sealed this
Twelfth Day of May, 2015

Michelle K. Lee
*Director of the United States Patent and Trademark Office*